Jan. 23, 1962

D. E. MILLER 3,017,841

END CONNECTION FOR THE CROSSBARS OF A FREIGHT
SUPPORTING AND RESTRAINING SYSTEM

Filed Dec. 5, 1958

INVENTOR.
Donald E. Miller,
BY
Davis, Lindsey, Hibben & Noyes
Atty's.

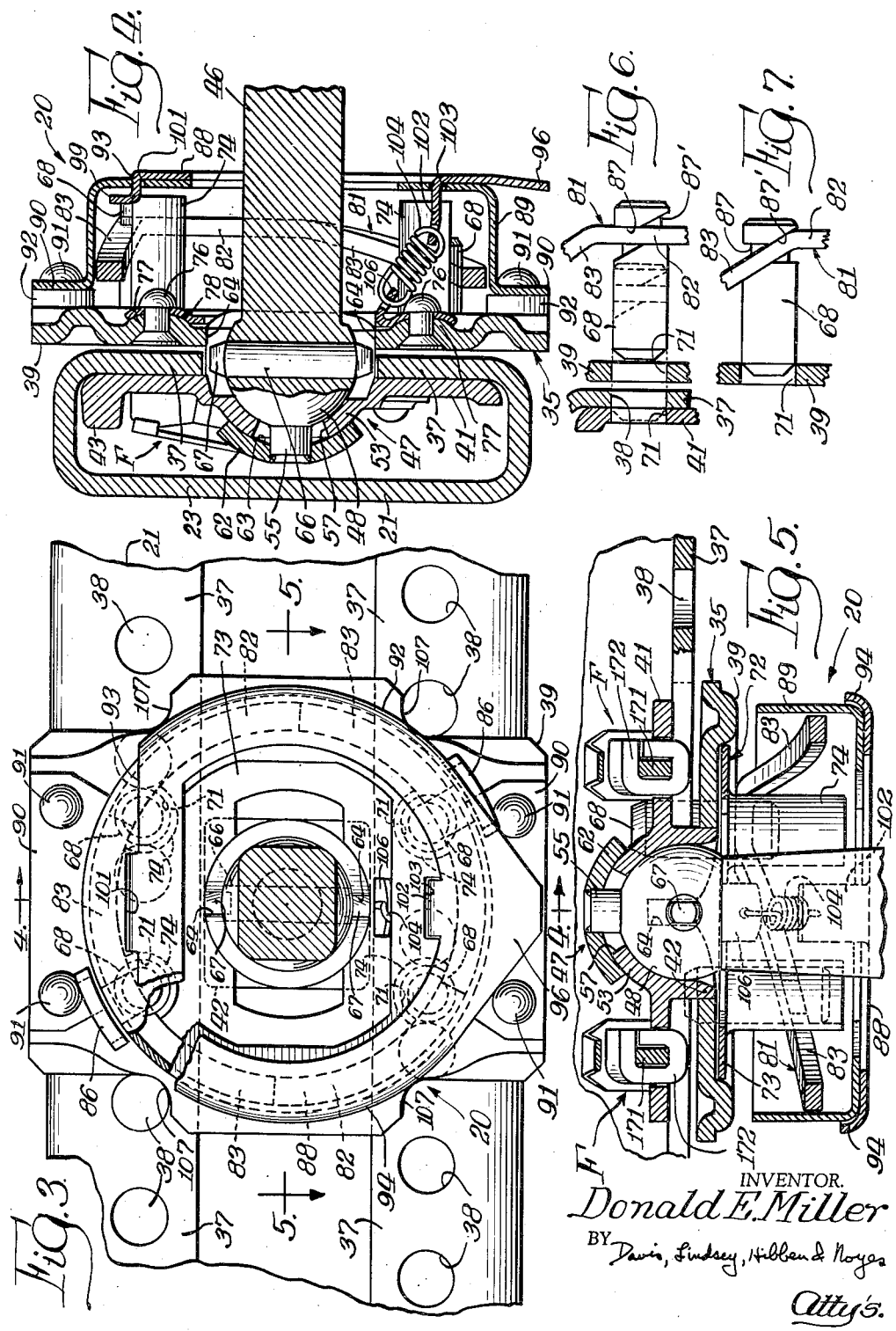

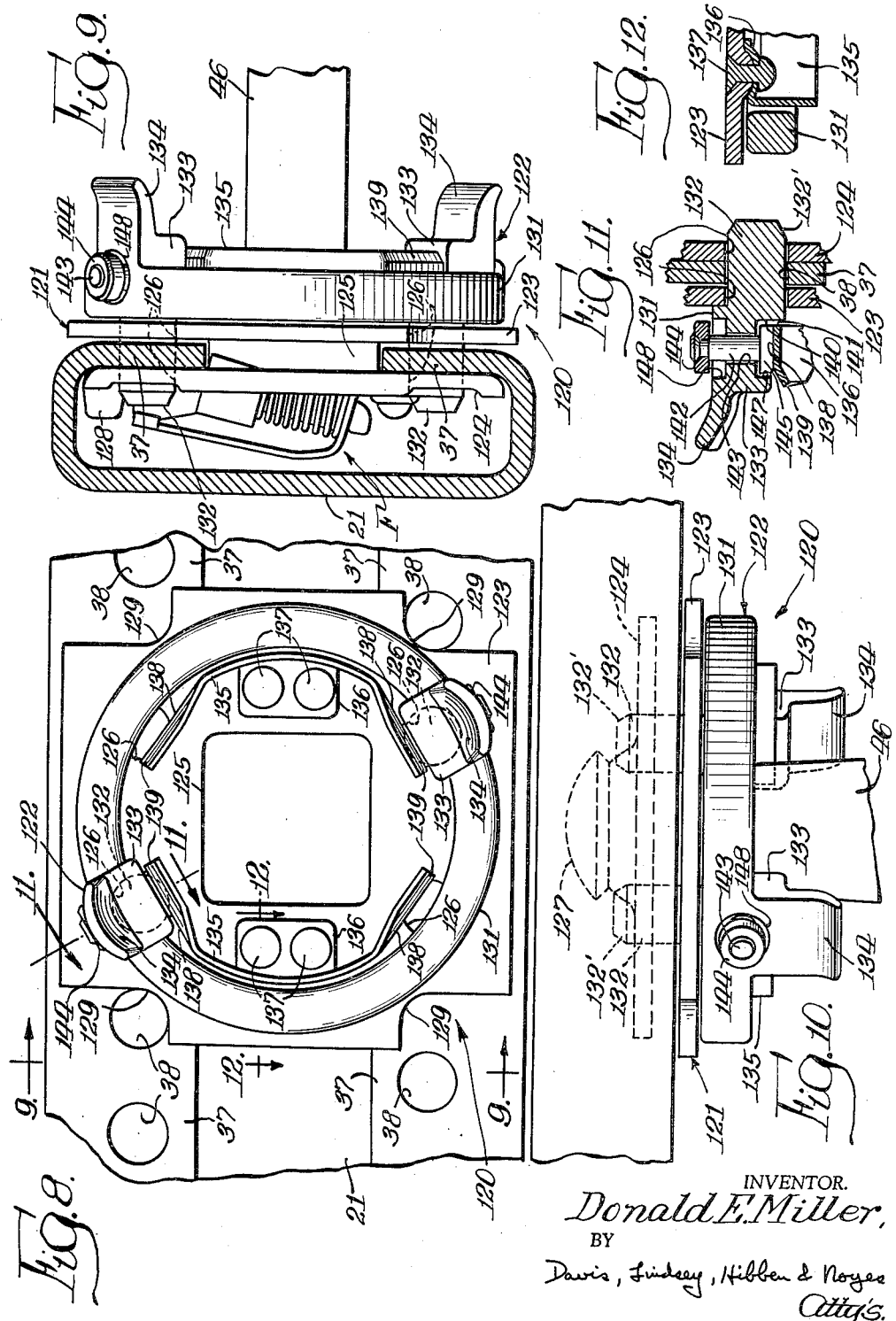

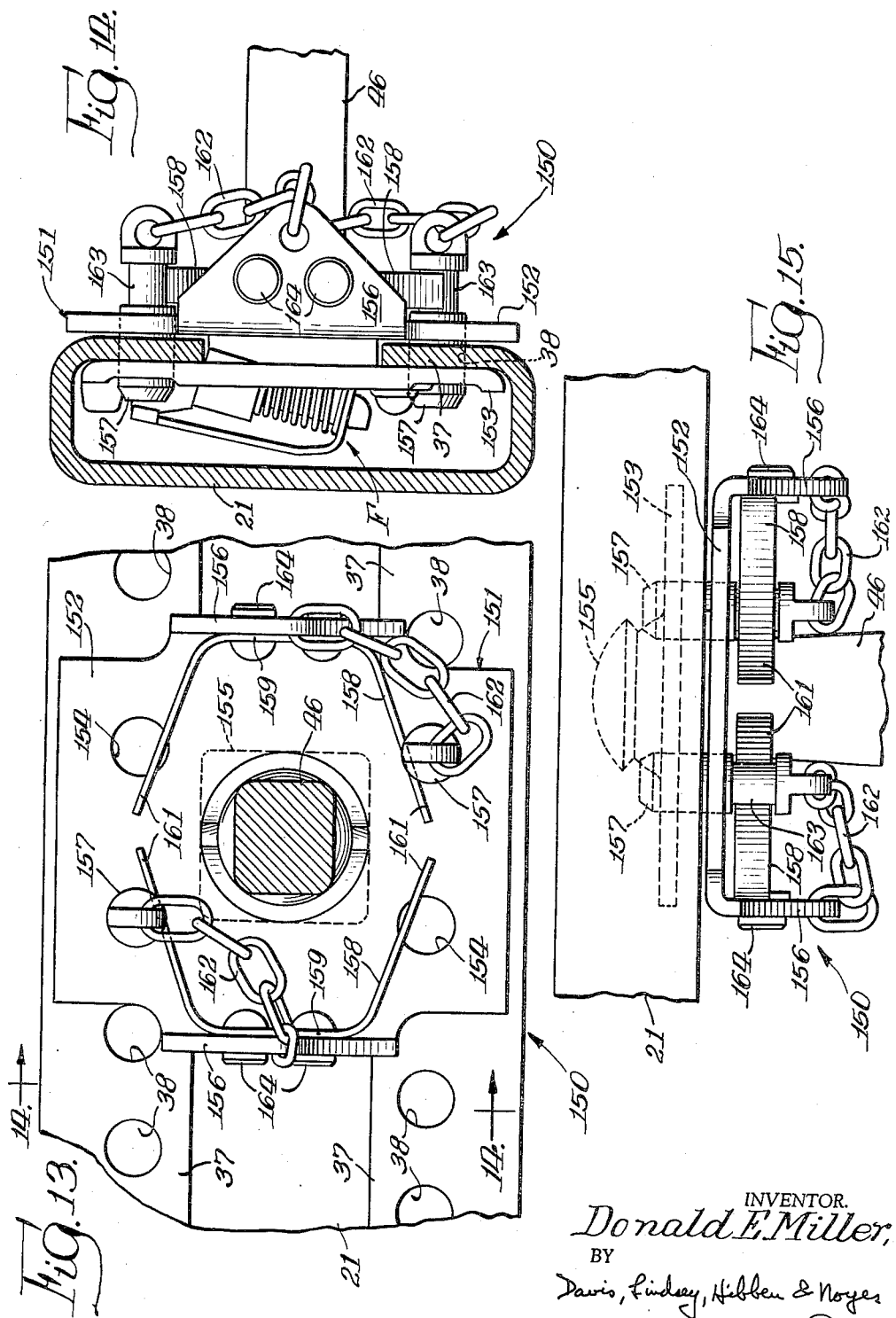

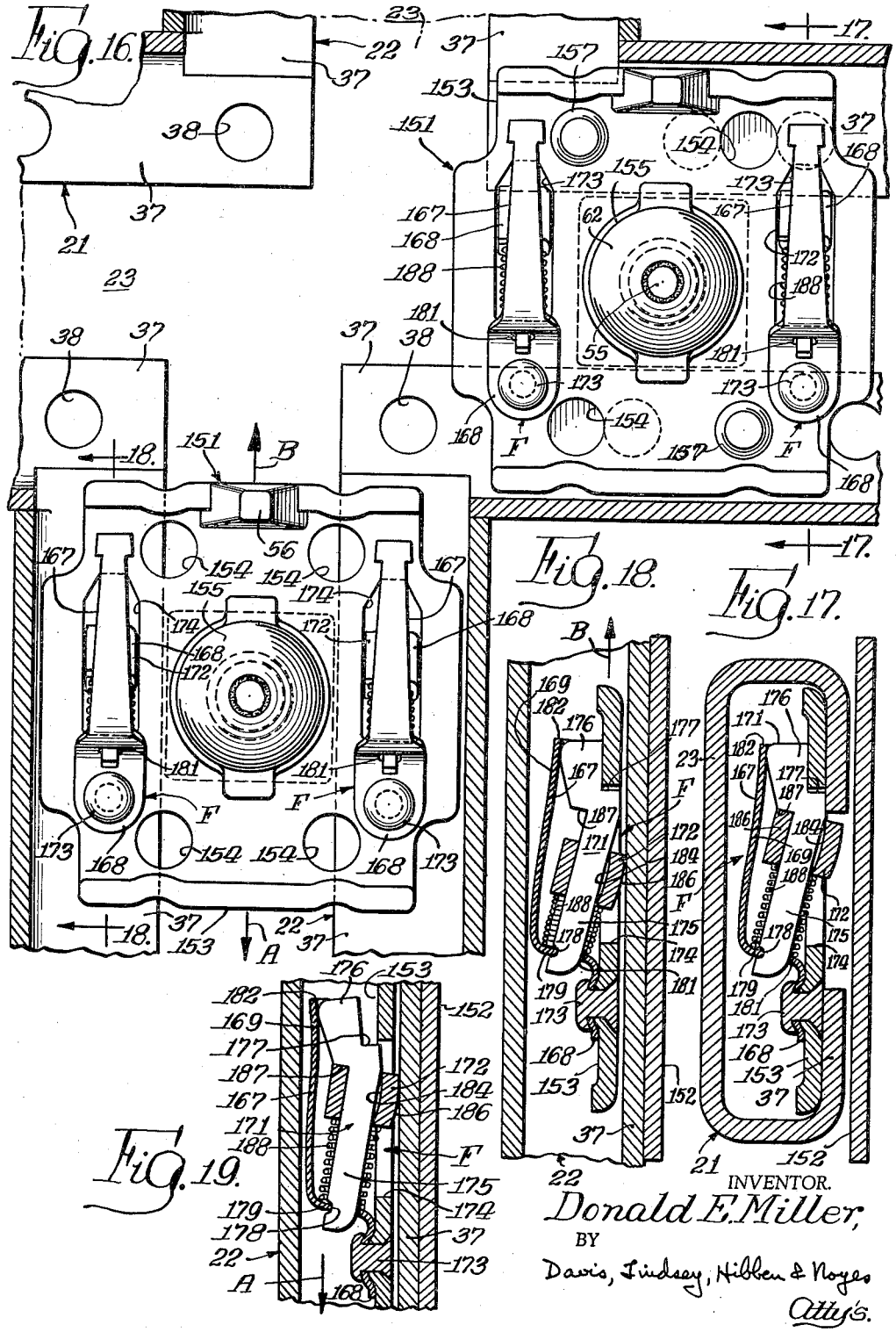

United States Patent Office 3,017,841
Patented Jan. 23, 1962

3,017,841
END CONNECTION FOR THE CROSSBARS OF A FREIGHT SUPPORTING AND RESTRAINING SYSTEM
Donald E. Miller, Mount Prospect, Ill., assignor, by mesne assignments, of one-fourth to The Atchison, Topeka and Santa Fe Railway Company, a corporation of Kansas, one-fourth to The New York Central Railroad Company, a corporation of Delaware, one-fourth to The Pennsylvania Railroad Company, a corporation of Pennsylvania, and one-fourth to Union Pacific Railroad Company, a corporation of Utah
Filed Dec. 5, 1958, Ser. No. 778,421
31 Claims. (Cl. 105—369)

This invention relates to a freight supporting and restraining system for vehicles and more particularly relates to the end connections on the crossbars of such a system.

The current use and development of various types of freight supporting and restraining systems for safely transporting freight and lading in vehicles has resulted in the necessity of providing a highly versatile and efficient end connection for slidably connecting the crossbars of the system to a channeled path network formed on the side walls of the vehicle. The design of the end connections must be such that the crossbars can be rapidly and easily moved to various positions of adjustment on the path network and readily secured thereto in various operative positions by a simple and strong joint. Moreover, in order to prevent theft or loss of the crossbars, the crossbar end connections should have an integral type construction and should be permanently entrained in the path network of the system.

The present invention provides an improved end connection for the crossbars of a freight supporting and restraining system of the type described in a copending application by Donald E. Miller and Edmund Frank, Serial No. 756,350, filed August 21, 1958, now Patent No. 2,973,724, dated March 7, 1961. The crossbar end connections to be described hereinafter permit rapid transfer of a crossbar to various positions spanning the interior of the vehicle and rapid connection and disconnection from a load supporting position. In addition, an integral or self-contained construction is employed to eliminate loose parts and the crossbar is permanently entrained in the path network.

It is a general object of the present invention to provide a novel and improved end connection for the crossbars of a freight supporting and restraining system for a vehicle or the like.

Another object of the invention is to provide a novel and improved end connection for the crossbars of a freight supporting and restraining system, the end connection being characterized by a unitary construction and providing permanent entrainment of the crossbars in the system.

An additional object of the invention is to provide a novel and improved end connection of the aforementioned type which minimizes theft or loss of the crossbars.

A further object of the invention is to provide an improved end connection for the crossbars of a freight supporting and restraining system that is rugged in construction, positive in action, simple to operate and maintain, and economical to manufacture.

Still another object of the invention is to provide an end connection for the crossbars of a freight supporting and restraining system which includes a novel provision for preventing free fall of the crossbars during downward movement thereof on the channeled path network of the system.

Many other objects and advantages of the invention will be apparent upon making reference to the accompanying detailed description and drawings, in which:

FIG. 3 is a transverse view taken along the line 3—3 of FIG. 1 with the parts in a different position;

FIG. 4 is a longitudinal sectional view taken along the line 4—4 of FIG. 3;

FIG. 5 is a horizontal sectional view taken along the line 5—5 of FIG. 3;

FIGS. 6 and 7 are fragmentary views of a portion of the end connection of FIGS. 1–5 showing certain parts thereof when in different positions;

FIG. 8 is an end elevational view of an alternate crossbar end connection construction comprising another specific embodiment of the invention;

FIG. 9 is a side elevational view with some parts in section taken along the line 9—9 of FIG. 8;

FIG. 10 is a top plan view of the crossbar end connection of FIG. 8 with some parts thereof in dotted line;

FIG. 11 is a fragmentary sectional view taken along the line 11—11 of FIG. 8;

FIG. 12 is fragmentary sectional view taken along the line 12—12 of FIG. 8;

FIG. 13 is an end elevational view of another crossbar end connection comprising another specific embodiment of the invention;

FIG. 14 is a side elevational view with parts in section as taken along the line 14—14 of FIG. 13;

FIG. 15 is a top plan view of the end connection of FIG. 13 with some parts thereof in dotted line;

FIG. 16 is a fragmentary elevational view of one of the intersections of the path network that is carried on the side walls of a vehicle and showing the crossbar end connection of the present invention in two positions therealong;

FIG. 17 is a vertical sectional view taken along the line 17—17 of FIG. 16;

FIG. 18 is a vertical sectional view taken along the line 18—18 of FIG. 16; and

FIG. 19 is a view similar to FIG. 18 showing certain parts in a different position.

Figure 1:
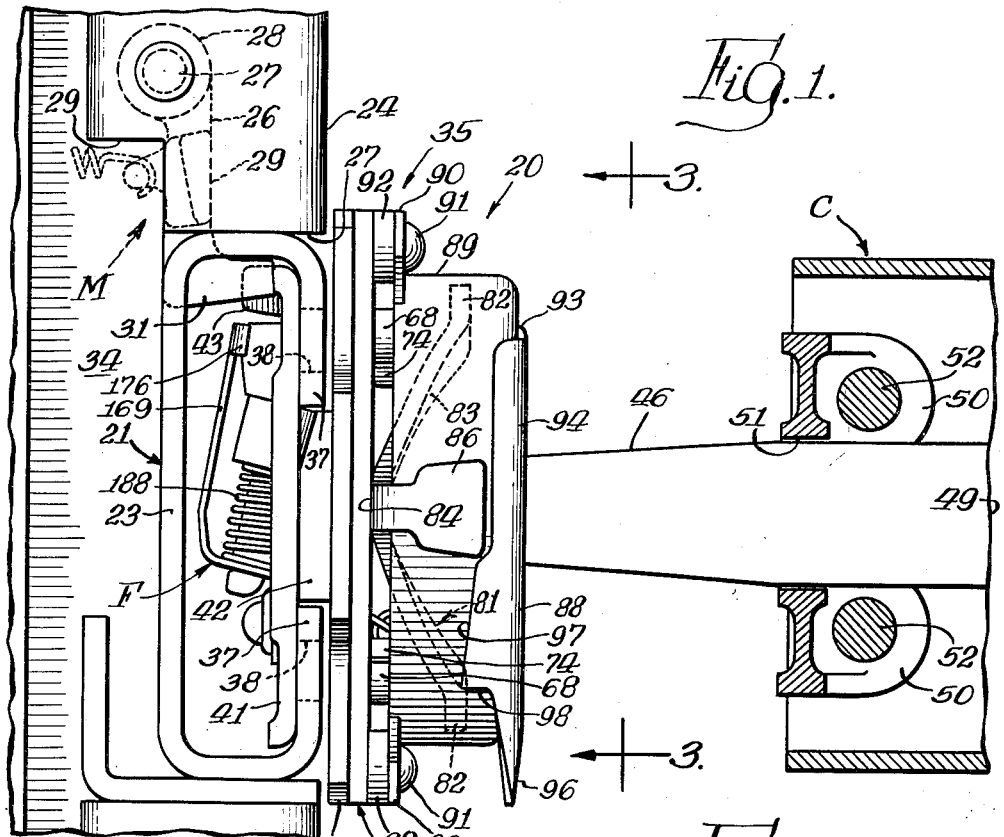
FIG. 1 is a fragmentary side elevational view of an end connection constructed according to the principles of the present invention and comprising one specific embodiment thereof.

Briefly described, the improved end connection of the invention comprises a slider and pinning assembly, the former being adapted to slidably mount and permanently entrain the end connection and crossbar in a channeled path network of the system that is mounted on the side walls of the freight chamber of the vehicle. The path network of the system is preferably formed by a plurality of horizontally and vertically intersecting channels having opposed inturned coplanar inner flanges for receiving and guiding the sliders of each end connection. The vertically arranged inner flanges of the path network are preferably formed with a series of perforations which provide anchor points for receiving one or more extensible and retractable pins of the pinning assembly for securing the end connection to the path network. The present invention relates particularly to the various pinning arrangements employed in the end connections for securing a crossbar at selected points along the path network. In addition, the present invention also contemplates a novel pivotal joint construction for securing the end connection to the crossbar and a fall retarder mechanism for increasing the frictional resistance of the end connection along the path network during downward movements of the crossbar.

Referring now to FIGS. 1 to 7 of the drawings, one specific slider type end connection 20 is illustrated in operable position with a crossbar C for securing the latter to the path network of a freight supporting and restraining system carried on the side walls of the freight chamber of a vehicle. Such a system is disclosed and described in the aforementioned copending application Serial No. 756,350 and will be briefly described hereinafter.

The aforementioned path network is best seen in FIG. 16 and comprises a support structure including a plurality of vertically spaced horizontal channels or belt rail members 21 that extend the full length of the vehicle, and a plurality of horizontally spaced vertically arranged intersecting channels or upright members 22 which extend from the floor to the ceiling of the vehicle. The channels 21 and 22 are preferably C-shaped in cross-section and are arranged with their web portions 23 in a vertical plane and disposed outwardly of the interior of the car for connection to the side walls thereof. As hereinafter used, the terms "inner" and "outer" or "inwardly" and "outwardly" have reference to the interior of the vehicle or other freight chamber.

Figure 2:
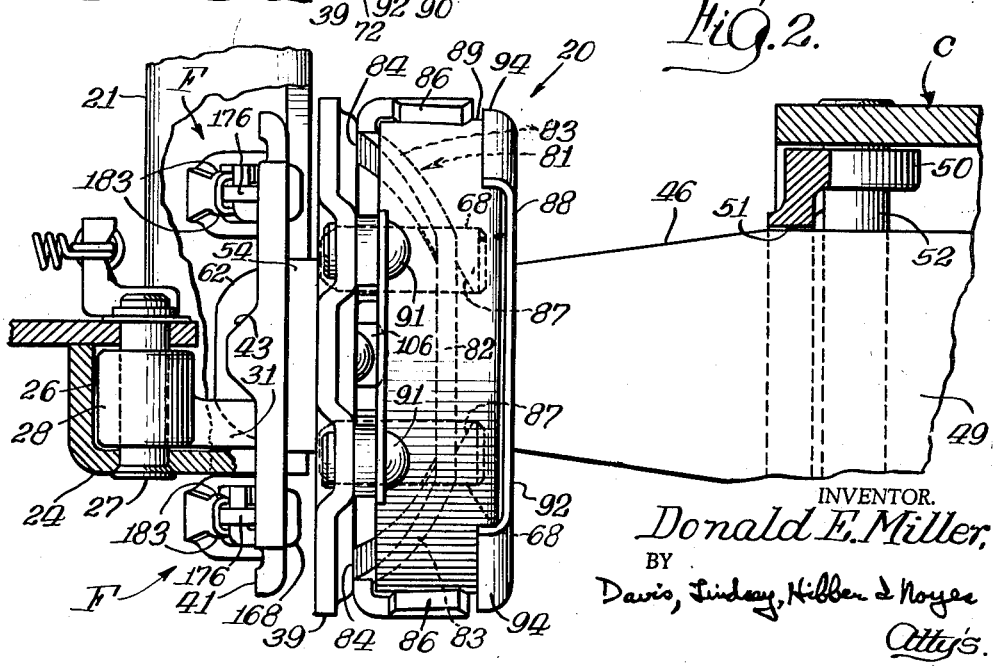
FIG. 2 is a top plan view of the end connection of FIG. 1, with parts broken away to show underlying parts.

In the illustrated position of the components in FIGS. 1 and 2, the end connection 20 and the crossbar C are disposed adjacent the intersection of a horizontal belt rail 21 with the doorway of the vehicle, the vertical channel member at this point being formed as a doorpost 24. The doorpost 24 is cut out or notched, as at 27, at the intersection with the horizontal belt rail member 21 and includes structure for mounting a doorway rail member (not shown) in position spanning the doorway as a continuation of the horizontal belt rail 21 so as to permit movement of a crossbar C into an operative position in the doorway area. The aforementioned structure also includes mechanism, indicated generally at M, for maintaining the doorway rail locked in an operable position spanning the doorway and for blocking passage of a crossbar out of the otherwise open channel end of the horizontal belt rail member 21 when a doorway rail is not engaged therewith.

The main functional component of the mechanism M is a spring biased blocking pawl 26 that is pivotally mounted by a longitudinal pin 27 in the doorpost 24 for transverse inward and outward swinging movement at a point somewhat above and outwardly of the intersection of each horizontal belt rail 21 with the doorway of the vehicle. To this end, the pawl 26 is formed with an enlarged cylindrical boss portion 28 at its upper end, a depending shank 29 and a transversely inwardly extending foot portion 31 carried at the lower end of the shank 29. The pawl 26 pivots between an angularly outwardly inclined position in response to the movement of a doorway rail member into spanning relation across the doorway and a substantially vertical crossbar obstructing position when a doorway rail is not in position spanning the doorway. The crossbar obstructing or blocking action is accomplished by the foot portion 31 and a cooperating abutment on the end connection 20 which engages the foot portion 31 as described in more detail below. A latch and related structure (not shown) contribute to the action of the mechanism M and are described in more detail in the aforementioned copending application Serial No. 756,350.

The end connection 20 comprises generally a slider assembly 35 having a pinning mechanism for securing the slider assembly 35 and the crossbar C to the path network. To this end, the horizontal and vertical channels 21 and 22 each include longitudinally extending inturned coplanar inner flanges 37 for coaction with the slider assembly 35, the flanges 37 being formed with a series of perforations or apertures 38 to facilitate the pinning operation. The slider assembly 35 is mounted at the end of the crossbar C and includes a transversely spaced pair of parallel generally rectangular inner front and outer back plates 39 and 41, respectively, the back plate 41 being somewhat smaller than the front plate 39 and spaced therefrom by a distance only slightly greater than the thickness of the flanges 37 to permit the plates to straddle and embrace the flanges 37. The plates 39 and 41 are maintained in parallel spaced relation by a rectangular shaped block member 42 (FIG. 3) at the hub of the slider assembly 35 which may be formed integrally with the back plate 41 or as a separate piece. The height and width of the block 42 are slightly less than the distance between the opposed edges of the inturned inner flanges 37 so as to provide a guiding action during sliding movement of the crossbar.

As best seen in FIGS. 2 and 4, the back plate 41 of the slider assembly 35 has an outwardly extending abutment 43 carried on its upper edge for engagement with the foot portion 31 of the blocking pawl 26 to block passage of a crossbar C. It is to be noted that the extent of transverse projection of the abutment 43 is such as to engage the foot portion 31 when the latter has been pivoted into a generally vertical crossbar obstructing position and to permit passage of the slider assembly 35 and crossbar C into a doorway rail member when the latter has been properly locked into position spanning the doorway and the blocking pawl has been retracted.

In order to connect the slider assembly 35 to the crossbar C and to provide limited pivotal and telescoping movement therebetween, an intermediate load bar 46 is connected to the hub of the slider assembly 35 by a ball and socket type universal joint, indicated generally at 47 (FIG. 4). Referring particularly to FIGS. 4 and 5 in conjunction with FIGS. 1 and 2, it will be seen that the load bar 46 is formed with a ball 48 at its slider-engaging end and its other end 49 has a sliding telescopic engagement with the crossbar C. The telescoping relation is necessary to accommodate dimensional variations in the transverse width of the vehicle and also relative motion of the vehicle sidewalls during transit. One exemplary construction of a suitable telescopic mounting comprises a pair of mounting brackets 50 in the opposite ends of the crossbar C, only one being illustrated in FIGS. 1 and 2. Each bracket 50 is formed with a central opening 51 for slidably receiving the portion 49 of the load bar 46. The bracket 50 is secured in the end of the hollow crossbar C by pins 52 staked at their outer ends to the crossbar C. A suitable abutment (not shown) is provided on the remote inner end of the bar portion 49 to prevent detachment of the load bar 46 from the bracket 50.

The ball and socket joint 47 is centered transversely between the front and back plates 39 and 41 at the load point of the slider assembly 35. This arrangement is advantageous in that it precludes the transmission of bending moments to the path network while accommodating pivotal movement between the crossbar and path network. The joint includes an outwardly domed hemispherically shaped socket 53 formed in the back plate 41 for receiving the ball end 48 of the load bar 46. The ball 48 has an axially extending pin or stub shaft portion 55 that extends through an inwardly tapered opening 57 in the socket 53. The tapered opening 57 is sufficiently large to accommodate a limited amount, in this case approximately 15°, of universal movement between the load bar 46 and the slider assembly 35. In order to maintain the ball 48 seated in the socket 53, a complementally shaped hemispherically cap 62 is secured to the outer end of the pin 55 such that the cap 62 is free to slide on the outer surface of the socket 53. Thus, the cap 62 provides a bearing surface 63 for transmitting axial loads imposed on the crossbar C to the slider assembly 35 of the end connection 20 as well as to prevent disengagement of the load bar 46 from the slider assembly 35. The socket 53 is so positioned as to maintain the ball 48 substantially centered in relation to the flanges 37 of the channels 21 and 22.

The back plate 41 and rectangular shaped spacer member 42 are provided with a pair of vertically disposed transversely extending recesses or slots 64 (FIGS. 3 and 4) which extend from a point generally coincident with the base of the socket 53 transversely inwardly through the back plate 41 and rectangular shaped spacer member 42 and thence through the front plate 39. A pin 66 extends through the center of the ball 48 and has its end portions 67 projecting diametrically outwardly of the ball and into the slots 64 such that the end portions are guidably retained by the adjacent side walls of the slots 64. Thus, any tendency of the crossbar C and load bar 46 to rotate relative to the end connection 20 is prevented while still permitting relative pivotal movement therebetween. In this instance, the pin ends 67 and the slots 64 are sized so as to accommodate approximately 15° vertical angular inclination of the load bar 46 relative to the slider assembly 35. As best seen in FIGS. 3 and 5, the slots 64 and end portions 67 of the pin 66 are preferably rectangular in shape, the end portions 67 being tapered upwardly to insure a uniform mating surface contact with the end walls of the slots 64 when the load bar 46 has been moved either upwardly or downwardly to the full extent of its angular position.

Thus, the pin 66 prevents relative rotation between the load bar 46 and slider 35 and provides a universal, rather than a true ball joint connection, therebetween. The universal joint is desirable in that the possibility of accidentally or improperly orienting a crossbar on the path network in relation to the expected load is precluded and the consequent possibility of a crossbar becoming bent or broken is reduced. This is a significant advantage where a lightweight crossbar section is utilized having the necessary strength properties in only one plane. The vertical arrangement of the pin 66 and slots 64 is indicated where the principal loads to be resisted in general service are longitudinal or impact loads, rather than vertical or platform loads. It will be understood however, that in vehicles, subject to more restricted and less severe service, a ball joint, rather than a universal joint, could be utilized, this joint permitting rotation as well as limited pivotal movement of the crossbar C and load bar 46.

The pinning means of the end connection 20 preferably comprises four transversely shiftable pins 68 and mechanism for selectively extending and retracting diagonally opposed pairs of the pins 68 into and out of engagement with a corresponding pair of aligned perforations 38 in the path network. To this end, the front and back plates 39 and 41 are formed with four transversely aligned holes 71 (FIG. 3) arranged on the slider assembly 35 for movement therewith into registry with a pair of perforations 38 in the opposed flanges 37 of the horizontal belt rails 21. As will be apparent from FIG. 3, all four of the holes 71 do not coincide at any one time with four perforations 38 in the path network, the perforations 38 in the upper and lower flanges of the horizontal belt rails 21 being horizontally staggered or offset and having a spacing somewhat closer than the horizontal spacing between holes 71. Thus, by selective engagement of a particular pair of diagonally opposite pins 68, a minute adjustment of the location of the slider assembly 35 on the path network may be obtained. The pins 68 are supported for movement through the holes 71 by a guide member 72 that includes a washer-like portion 73 carried on the inner side face of the front plate 39 and having four trough-like guide portions 74 extending transversely inwardly from the periphery of the washer-like portion 73. The trough-like portions 74 are semi-cylindrical in shape and are arranged to engage and support the pins 68 when they are in a retracted position. The semi-cylindrical concave surfaces of the guide portions 74 are thus disposed symmetrically and radially inwardly of the holes 71. The washer-like portion 73 of the guide member 72 may be secured to the inside face of the front plate 39 by rivets 76, the front plate 39 being dimpled, as at 77, to receive the heads of the rivets 76 and thus insure a flat surface. The washer-like portion 73 may be complementally dimpled, as at 78, around its periphery for engagement with the dimpled portion 77 to permit the guide member 72 to be disposed closely adjacent the inner side face of the plate 39.

The mechanism or means for effecting projection and retraction of a diagonally opposed pair of pins 68 includes a circular cam ring member 81 having a pair of diametrically spaced arc portions 82 lying disposed in a plane spaced axially inwardly from the front plate 39 (FIGS. 2–4) and a pair of oppositely inclined arc portion 83 disposed between and contiguous to the arc portion 82. The inclined arc portions 83 each have a flattened central portion 84 that contacts the inner side face of the front plate 39. A pair of diametrically arranged lugs 86 (FIGS. 2 and 3) are integrally formed with the cam ring 81 and extend from the flattened portions 84 thereof to provide a convenient point for manually rotating the cam ring 81.

As will be seen from FIGS. 6 and 7, each of the pins 68 has a compound cam slot 87—87' for receiving the cam ring 81 in sliding engagement therethrough. The slot has a generally inclined X-shape consisting of a semi-circular groove 87 in a plane normal to the axis of the pin 68 and an intersecting groove 87' in a plane inclined to the axis of the pin 68 such that the circular arc portions 82 and the inclined portions 83 of the cam ring 81 will slidably coact with the slot 87—87' upon rotation of the ring 81. Thus, in FIG. 6 the cam ring portion 82 is engaged with the slot portion 87 so that the pin 68 is retained in retracted position relative to the hole 71 in the front plate 39. In FIG. 7 the cam ring 81 has been rotated so that the inclined ring portion 83 coacts with the slot portion 87' to effect either projection or retraction of the pin 68 relative to the hole 71, depending upon the direction of rotation of the ring 81. It should be noted that when a pair of the pins 68 are in a fully outwardly extended position, the end connection 20 will be secured to the path network by a simply supported arrangement, the aforementioned simple support being provided by the front and back plates 39 and 41 which support the pins 68 substantially at each end and the flanges 37 which exert a central resisting force. In addition, the central location of the ball and socket type universal joint 47 at the load point of the slider assembly 35 is effective to prevent the imposition of any bending moments on the pins 68.

It will be apparent from the drawings that with the cam ring in the position illustrated in FIGS. 1 and 2, that is with the lugs 86 disposed in a horizontal plane, the ring portions 82 will be engaged in the slot portions 87 in all four pins 68 such that all of the pins will be in a fully retracted position on their guide portions 74. In this position, the outer ends of the pins are slightly recessed from the outer surface of the front plate 39 thereby permitting the end connection 20 and slider assembly 35 to be moved freely along the path network. Rotation of the cam ring 81 from the horizontal position illustrated in FIGS. 1 and 2, as for example in a clock-wise direction, to the position illustrated in FIG. 3, is effective by the interaction of the inclined portions 83 of the cam ring 81 in the slot portion 87 to extend a diagonal pair of pins 68 into engaged relationship with an aligned pair of perforations 38 in the path network and the corresponding openings in the plates 39 and 41. Continued clock-wise rotation of the cam ring 81 until flattened apex portions 84 come into alignment with the holes 71 is effective to advance a diagonally opposed pair of pins 68 into a fully extended position. Thus, a particular pair of pins 68 will be in a fully axially outwardly extended position whenever the lugs 86 are rotated to a position overlying the corresponding holes of the pins. It will be understood that by movement of the crossbar along the channel 21, diagonally opposed sets of aligned slider holes 71 can be brought into registry with a desired set of flange apertures 38 and thereafter the cam ring 81 may be rotated in whatever direction is necessary to effect a pinning operation. Thus, the cam ring 81, in addition to serving as a retainer for preventing disengagement of the pins 68 from the guide member 72 also serves as the actuating member for effecting a pinning or releasing operation.

Once the end connection 20 and crossbar C have been pinned to the path network in a desired location it will be apparent that precautions must be taken to prevent unintended disengagement thereof. Accordingly, means in the form of a latch is provided to prevent such disengagement, it being necessary to first disengage the latch as an intermediate step before the cam ring 81 can be moved to a new position after a pinning operation has been effected. In the present instance, the latch comprises a ring-like member 88 pivotally mounted on an annular open end cup-shaped housing 89 which encloses the pins 68, the pin guides 74, and the cam ring 81, the housing 89 being effective to protect the mechanism of the end connection 20 and to prevent the accumulation of foreign particles therein. The housing 89 includes a pair of vertically arranged upper and lower flanges 90 for securing the housing to the front plate 39, as by rivets 91. A plurality of spacing washers 92 are interposed between the flanges 90 and the front plate 39. The ring-like latch member 88 has a truncated horizontal upper edge portion 93, a pair of rounded side portions 94 (FIGS. 2 and 5) which wrap around the housing 89, and a depending tapered lower end 96. The side portions 94 extend toward the cam ring lugs 86 and are formed with a pair of tapered portions 97 (FIG. 1) which are undercut to form shoulders 98. The shoulders 98 are positioned for engagement with the ends of the lugs 86 when the latter are rotated to a diagonal position in alignment with a pair of holes 71 to effect a pinning operation. The truncated upper edge 93 also includes a centrally disposed inwardly offset tab portion 99 (FIG. 4) extending through a slot 101 in the housing 89 for pivotally mounting the latch member 88 about an elevated horizontal axis.

As will be apparent from FIG. 1, the latch member 88 must be maintained in close adjacency to the end wall of the housing 89 in order to maintain the ends of the lugs 86 in latching engagement with the shoulders 98. In addition, means must be provided to permit the latch member 88 to pivot away from the housing 89 in order to accommodate passage of a lug into engagement with the shoulder 98. For such purpose the latch member 88 is formed with a tang 102 (FIG. 4) that extends through a slot 103 in the end wall of the housing 89 for connection to one end of a spring 104. The other end of the spring 104 is anchored to a tab 106 on the guide member 72 of the slider assembly 35. Pivotal movement of the latch member 88 away from the housing 89 is thus resisted by the action of the spring 104 which maintains the latch member 88 in spring biased engagement with the housing 89.

The latch operates as follows. Upon rotation of the cam ring 81, one of the lugs 86 will engage a tapered portion 97 of the latch member 88 causing it to pivot at 99—101 against the action of the spring 104 until the lug comes into registry with the shoulder 98. Tension in the spring 104 will then cause the latch member 88 to snap downwardly into latching relation with the lug 86 to thus retain the cam ring 81 and a particular pair of pins 68 engaged in the holes 71 and perforations 38. The latch may be released by grasping the depending lower end 96 and pivoting the latch member 88 upwardly against the action of the spring 104 until the shoulder 98 clears the lug 86 whereupon the cam ring 81 can be rotated to effect retraction of the pins 68.

Inasmuch as the front plate 39 completely covers the perforations 38 in which the pins 68 are to be engaged during a pinning operation, the corners thereof are cut out, as at 107 (FIG. 3) and formed with radii substantially equal to that of the perforations 38 so that when the corners 107 are moved into alignment with a particular pair of diagonally arranged perforations, the pair of pins most closely adjacent thereto will be in alignment with an underlying pair of perforations 39 in the path network. Thus, the curved cut-outs 107 function as visual guides to facilitate rapid positioning of the slider assembly for a pinning operation.

As will be described in more detail hereinafter, the end connection 20 also includes means for preventing free fall of a crossbar C when the latter is being moved downwardly in a vertical channel member 22 from some elevated position in the vehicle to a lower position. Such means comprises a fall retarder, indicated generally at F in FIGS. 1, 2, and 5, mounted on the plate 41 of the slider assembly 35.

Referring now to FIGS. 8–12, an alternate crossbar end connection 120 is illustrated which comprises a second specific embodiment of the present invention. The end connection 120 is similar to the end connection 20 to the extent that it includes a slider assembly 121 and a pinning assembly 122, the end connection 120 differing from the previously described embodiment primarily in the construction and operation of the pinning assembly 122.

The slider assembly includes a transversely spaced pair of front and back plates 123 and 124, respectively, which are maintained in spaced relationship by a rectangular shaped spacer member 125 carried at the hub of the plates 123 and 124 such that the latter are spaced a somewhat greater distance than the thickness of the flanges 37. The front and back plates 123 and 124 include four transverse holes or openings 126 for cooperation with the pinning assembly 122. A ball and socket type universal joint 127 (FIG. 10) is disposed centrally of the plates 123 and 124 to accommodate angular inclinations of the crossbar C relative to the end connection 120 and to prevent the transmission of bending moments to the path network as in the previous embodiment. The plate 124 also includes a projecting abutment 128 (FIG. 9) for cooperation with a blocking mechanism in the doorpost of the vehicle as previously described. The corners of the plate 123 are cut out, as at 129 (FIG. 8), on a radius substantially equal to that of the perforations 38 to facilitate rapid adjustment of the slider assembly to a pinning position in the manner previously described. The slider assembly 121 also includes a fall retarding mechanism F for preventing free fall of a crossbar C, the details of the construction and operation of the fall retarder mechanism F being set forth hereinafter.

The pinning assembly 122 comprises a ring member 131 that includes a pair of integral diametrically arranged pins 132 which extend axially from the outer end face of the ring member 131 and a pair of rectangular shaped bosses 133 which extend axially from the inner end face of the ring member 131 in axial alignment with the pins 132 and terminate in radially flaring curved finger grips or tabs 134. The spacing of the pins 132 corresponds to the diagonal spacing between a particular pair of perforations 38 in the path network with which the pins are to be engaged. A pair of spring-type latch members 135 (FIG. 8) are provided for coaction with the pins 132 to retain the latter in engaged relationship with the slider assembly 121 and the perforations 38 of the path network, the latch members 135 having a generally arcuate shape with flexible or depressible end portions and being mounted on the plate 123 by means of centrally disposed flange portions 136 and rivets 137 extending therethrough. Each latch member 135 has its ends flattened, as at 138, and the inner side edge portions thereof bent radially inwardly, as at 139, to provide inclined cam surfaces for coaction with tapered end portions 132′ (FIG. 11) on the pins 132, as hereinafter described.

As best seen in FIG. 11, each of the boss portions 133 of the ring member 131 is undercut on its radial inner surface to define a shoulder 140 adapted to engage the inner side edge, indicated at 141, of a latch member 135 when the pins 132 are in pinned position with respect to the bores 126 and perforations 38.

In order to disengage the edges 141 of the latch members 135 from the shoulders 140 to permit retraction of the pins 132 from the path network so that the end connection 120 can be moved to a new position, a pair of plungers are provided for depressing the flattened ends 138 of the latch members 135 inwardly and out of engagement with the shoulders 140. Each plunger includes a shaft portion 142 slidably mounted in a bore 143 in the bosses 133, an enlarged button or head portion 144 mounted on the outer end of the shaft portion 142, and a disc-like pad portion 145 carried on the inner end of the shaft portion 142. In the normal outwardly flexed position of the latch members 135 the ends 138 engage the pad portions 145 of the plungers so that the buttons 144 normally project somewhat beyond the bosses 133. However, when the ring 131 is grasped by the finger grips 134, the buttons 144 are easily depressed to flex the ends 138 inwardly of the shoulders 140 and thereby release the pins 132. In order to facilitate the aforementioned action, the boss portions 133 are countersunk, as at 147 and 148, to receive the pad portions 145 and the button portions 144, respectively.

In order to effect a pinning operation the operator grasps the ring member 131 at the grips 134 and concurrently depresses the buttons 144 to unlatch the pins 132. The ring member 131 and pins 132 may then be retracted axially inwardly of the slider assembly 121 to a fully disengaged position and the crossbar moved to a new location on the path network. Once the ring member 131 has been withdrawn axially inwardly of the slider assembly 121 a sufficient distance to be fully disengaged from the latch members 135, it can be supported by the load bar 46. As in the previous embodiment, the ring member 131 and its pins 132 may be rotated in either direction to permit the pins 132 to be aligned with the perforations of the path network. Thereafter, the ring and pin member is shifted axially toward the channel 21 so that the tapered end portions 132' on the pins 132 engage the cam portions 139 thereby deflecting the ends of the latch members 135 until the pins 132 are fully inserted in the holes 126 and perforations 38, as in FIG. 11. Then the resilient ends of the latch members automatically snap into locking relation with the shoulders 140.

The end connection 120 thus provides a simply constructed unitary type assembly for pinning the slider portion of the end connection to the path network. In addition, because of the integral type construction employed in the end connection 120 a strong rigid assembly results and the possibilities of malfunction are greatly reduced. Moreover, such a construction is economical to manufacture and maintain due to the small number of moving parts.

Referring now to FIGS. 13–15, another crossbar end connection 150 is illustrated which comprises a slider assembly 151 that is generally similar to the slider assemblies 35 and 121 of the previous embodiments in that it includes a pair of transversely spaced rectangularly shaped front and back plates 152 and 153, respectively, having four spaced transverse holes or openings 154 therethrough. A ball and socket type universal joint 155 is also provided as well as a fall retarder mechanism F for preventing free fall of the crossbar C when the latter is moved downwardly along the vertical members 22 to a lower position.

The slider assembly 151 differs from the previous embodiments in that the front plate 152 thereof is formed with a pair of inwardly extending flanges 156 which provide anchor points for securing a pair of load pins 157 thereto and for mounting a pair of generally U-shaped flat spring type pin retainers 158. The pin retainers 158 have flattened web or base portions 159 and flexible divergent arm portions 161, and are secured at their web or base portions 159 to the flanges 156 by means of rivets 164 such that the arm portions 161 extend toward each other and the pins 157 when the latter are inserted into a pair of the holes 154. The pins 157 are loosely connected to the flanges 156, as for example by chains 162, which are sufficiently long to permit a pin 157 to be inserted in either the upper or lower of the vertically aligned pairs of holes 154 adjacent each flange 156. In order to maintain the pins 157 engaged in the holes 154 and perforations 38 in the path network after a pinning operation has been effected, each of the pins 157 includes a reduced diameter portion or groove 163 adjacent its inner end which is of sufficient axial length to permit the retainer arm portions 161 to become seated therein when the pins 157 are in a fully engaged position.

Thus, in order to effect a pinning operation with the end connection 150, an operator need only determine which diagonal pair of the holes 154 the pins 157 are to be inserted in for the particular position of the slider 151, and thereafter each pin 157 is manually inserted in its respective hole by depressing the latch arm portions 161 a sufficient amount to permit the pins to enter the holes. When the pins are fully engaged, the flexible arm portions 161 will seat in the groove 163 of each pin, thereby preventing withdrawal of the pin until the respective arm portions 161 are again depressed.

Referring now to FIGS. 16–18 in conjunction with FIGS 1 and 2, the details of the construction and operation of the fall retarder mechanism F as utilized in each of the end connections 20, 120, and 150 of the present invention will now be described. For convenience, the fall retarder assemblies F will be described hereinafter with reference to the end connection 150, which includes the slider assembly 151 and chain connected pinning arrangement.

Each fall retarder assembly F is in essence a brake which is activated upon downward movement of a crossbar in one of the vertical channels of the path network to reduce the free fall velocity thereof to a very low value, in case the crossbar should slip accidently during handling. The mechanism of the fall retarder is such as to offer little or no resistance to upward movement of the crossbar and to be completely inoperative during movement of the crossbar along the horizontal belt rails 21.

As will be apparent from the drawings, a pair of fall retarders are provided on each end connection to achieve a properly balanced action. Each fall retarder comprises an elongated vertically arranged spring member 167 having an offset lower end 168, a lateral portion 179, and an upwardly extending body portion 169. A vertically disposed pivot arm 171 is carried by the spring member 167, and a shoe 172 is slidably carried on the pivot arm 171. The spring member 167 is secured at its offset lower end 168 to the lower back face of the back plate 153 by a rivet 173. An elongated opening 174 is formed in the back plate 153 generally underlying the pivot arm 171 to permit the shoe 172 to be moved to a position partially projecting into the opening 174.

As best shown in FIGS. 17–19, the pivot arm 171 includes an inwardly inclined bar portion 175 on which the shoe 172 is slidably mounted and an outwardly offset upper end portion 176 which defines a shoulder 177 adapted to enter the upper end of the elongated opening 174. The lower end of the portion 175 is notched, as at 178, to permit the pivot arm 171 to be mounted in a slot 181 on the horizontal offset portion of the spring member 167. The upper end, designated at 182, of the spring member 167 engages the offset upper end 176 of the pivot arm 171 for normally urging the pivot arm inwardly into abutting engagement with the rear face of the plate 153, as shown in FIGS. 17–18. The spring member 167 is sufficiently stiff and so shaped as to maintain the pivot arm 171 engaged with the plate 153 of the slider with considerable force. This engagement exists at all times except when a crossbar is being moved vertically downward in a path network, as indicated by the arrow A in FIGS. 16 and 19. The upper end 182 of the spring member 167 is provided with a pair of wrap around flanges 183 (best seen in FIG. 2) which enclose the offset end 176 of the pivot arm 167 and prevent disengagement therefrom.

The shoe 172 is preferably a hardened sleeve or bushing having a central rectangular shaped opening 184 therethrough to permit a sliding engagement on the pivot arm bar portion 175. When the shoe 172 is near the upper end of its travel on the pivot arm bar portion 175 its inner face 186 projects beyond the inner face of the plate 153, as seen in FIGS. 17 and 19, so as to make frictional braking engagement with a flange 37 of a vertical channel member 22 when the crossbar is being moved downwardly therein (FIG. 19). The face 186 of the shoe 172 may be roughened or knurled to provide additional frictional restraining force. In order to maintain the shoe 172 normally biased into an upper limit position on the pivot arm bar portion 175 as determined by a shoulder 187 formed by the offset end 176, a coil spring 188 is disposed around the pivot arm bar portion 175 between the shoe 172 and the horizontal offset 179 of the spring member 167. The spring 188 is thus effective to urge each shoe of each fall retarder assembly F into initial engagement with the inner flanges 37, whereupon the cam-like action of the shoes 172 will cause the pivot arms 171 to pivot outwardly against the action of the spring member 167 to the position shown in FIG. 19 when a crossbar is being moved vertically downwardly. The force of the spring member 167 is thus transmitted to the inner frictional engaging surface 186 of the shoe 172 immediately upon commencement of outward pivotal movement of the arm 171.

Thus, when an end connection has been moved into engagement with a vertical channel 22 and started downwardly, such as is illustrated by the position of the slider 151 at the lower part of FIG. 16 and in FIG. 19, the action of the spring member 167 causes the slider 151 to shift outwardly to bring the outer face of the front plate 152 into rubbing contact with the inner face of the flanges 37. A frictional restraining force is thus developed on two pairs of interfaces to substantially increase the frictional resistance to downward movement and thereby provide the safety features of the fall retarder mechanism. When the crossbar is raised, as indicated by the arrow B in FIGS. 16 and 18, the shoes 172 will move downwardly along the pivot arm bar portions 175 (FIG. 18), thereby compressing the coil springs 188 and permitting the offset upper ends 176 of the pivot arms 171 to engage the slider back plate 153, thus relieving the forces which the springs 167 impose on the shoes 172, the flanges 37, and the slider front plate 152. The crossbar C and end connection 150 can thus be moved upwardly quite easily as only the slight retarding force of the springs 188 is to be overcome.

As a further safety factor in the event of malfunction or failure of either or both fall retarder assemblies F, each vertical channel 22 is offset at its junction with a horizontal belt rail 21 (note FIG. 16) so that a crossbar must be shifted horizontally on passing each belt rail junction before continuing downwardly on a vertical channel 22. Thus, the farthest distance a crossbar could fall would be the distance of the vertical spacing between a pair of horizontal belt rails 21.

While only certain specific embodiments have been herein illustrated and described, it will be understood that variations and modifications may be effected without departing from the scope of the invention as defined in the appended claims.

I claim:

1. A crossbar end connection for adjustably connecting a load sustaining crossbar to a support structure carried by a wall, said support structure having pairs of elongated transversely spaced coplanar flanges arranged in intersecting horizontal and vertical paths, said end connection comprising slider means adapted to engage said flanges in embracing relation at opposite faces thereof, means mounted on said slider means and cooperable with the flanges of the horizontal paths for releasably locking said slider means at a selected position in a horizontal path, and fall retarder means mounted on said slider means and cooperable with the flanges of the vertical paths for resisting only downward movement of said slider means in a vertical path.

2. A crossbar end connection for adjustably connecting a load sustaining crossbar to a support structure carried by a wall, said support structure having pairs of elongated transversely spaced coplanar flanges arranged in intersecting horizontal and vertical paths, said end connection comprising a slider adapted to be connected to the end of a crossbar and having a pair of parallel spaced apertured plates adapted to be disposed at opposite faces of the flanges in embracing relation therewith, said slider being movable along the flanges for registering the apertures in said plates with cooperating apertures in the flanges, releasable locking means comprising a plurality of pins operatively supported on one of said plates and adapted to be engaged in the registered apertures, and fall retarder means mounted on the other of said plates and cooperable with said slider and the flanges for resisting only downward movement of the slider in the vertical paths.

3. A crossbar end connection for adjustably connecting a load sustaining crossbar to a support structure carried by a wall, said support structure having pairs of elongated transversely spaced coplanar flanges arranged in intersecting horizontal and vertical paths with the flanges in said horizontal paths having a series of apertures, said end connection comprising a slider adapted to be connected to the end of a crossbar and having a pair of parallel spaced apertured plates adapted to be disposed at opposite faces of the flanges in embracing relation therewith, said slider being movable horizontally between the flanges for registering the apertures in said plates with selected apertures in the flanges of the horizontal paths, releasable locking means comprising a plurality of pins carried by one of said plates and adapted to be inserted into and withdrawn from the registered apertures, and unidirectional spring actuated frictional means mounted on the other of said plates and cooperable with said slider and the flanges of the vertical paths for increasing the frictional resistance of said slider to only downward movement in the vertical paths.

4. A crossbar end connection for adjustably connecting a load sustaining crossbar to a support structure carried by a wall, said support structure having pairs of elongated transversely spaced coplanar flanges arranged in intersecting horizontal and vertical paths, said end connection comprising a slider having a hub portion adapted to be connected to the end of a crossbar, a pair of apertured plates centrally carried by said hub portion, said plates being disposed in parallel spaced relation and being adapted to be disposed at opposite faces of the flanges in embracing relation therewith, said hub portion being slidable between the flanges for registering the apertures in said plates with cooperating apertures in the flanges, releasable locking means comprising a plurality of pins operatively supported on one of said plates and adapted to be engaged in the registered apertures, and fall retarder means mounted on the other of said plates and cooperable with said slider and the flanges for resisting only downward movement of the slider in the vertical paths.

5. The structure of claim 4 further characterized in that said hub portion is provided with a recess for receiving and mounting a crossbar end.

6. A crossbar end connection for adjustably connecting a load sustaining crossbar to the support structure carried by a wall, said support structure having pairs of elongated transversely spaced coplanar flanges arranged in intersecting horizontal and vertical paths, said end connection comprising a slider having a hub portion and a pair of apertured plates centrally carried by said hub portion, said plates being disposed in parallel spaced relation and being adapted to be disposed at opposite faces of the flanges in embracing relation therewith, said hub portion being slidable between the flanges for registering the apertures in said plates with cooperating apertures in the flanges, releasable locking means comprising a plurality of pins operatively supported on one of said plates and adapted to be engaged in the registered apertures, fall retarder means mounted on the other of said plates and cooperable with said slider and the flanges for resisting only downward movement of the slider in the vertical paths, and socket means extending through said hub portion and having an opening through said one plate, said socket means being adapted to receive a complementary ball member in operative relation therewith for pivotally connecting the slider to the crossbar.

7. In a freight supporting and restraining system for a vehicle including structure defining a plurality of support paths on the side walls of the vehicle for slidably mounting a load sustaining crossbar in a plurality of positions transversely spanning the interior of said vehicle, the combination of a pair of elongated, transversely spaced, perforated coplanar flanges comprising a support path and a slider connection adapted to be connected to the end of a crossbar for securing the latter in various positions of adjustment along said path, said slider having a spaced pair of parallel plates disposed at opposite faces of said flanges in embracing relation therewith, said plates having at least one set of transverse aligned apertures therethrough positioned for movement into registry with the perforations in said flanges, and pin means carried on said slider and insertable through the registered apertures in both of said plates and the perforations in said flanges for releasably securing a crossbar to said path, said pin means thereby being simply supported at the ends thereof by said plates and being subjected to a central reaction force from said flanges.

8. In a freight supporting and restraining system for a vehicle including structure defining a plurality of horizontal support paths on the side walls of the vehicle for slidably mounting a load sustaining crossbar in a plurality of positions transversely spanning the interior of said vehicle, the combination of a pair of elongated, horizontal, transversely spaced coplanar, perforated flanges comprising a horizontal support path and a slider connection adapted to be connected to the end of a crossbar for securing the latter in various positions of adjustment along said path, said slider having a central hub portion and a pair of parallel spaced plates rigidly mounted on said hub portion and disposed at opposite faces of said flanges in embracing relation therewith, said plates having at least one set of transverse aligned apertures therethrough positioned for movement into registry with the perforations in said flanges, pin means carried on said slider and insertable through the registered apertures in both of said plates and the perforations in said flanges for releasably securing a crossbar to said path, said pin means thereby being simply supported at the ends thereof by said plates and being subjected to a central reaction force from said flanges, and universal joint means provided in said hub portion for pivotally connecting the slider to a crossbar, said joint means including a socket portion extending through said hub portion in vertical alignment with said simply supported pin means.

9. A load sustaining crossbar structure for spanning the interior of a freight chamber and adjustably securable at each end to support structure carried by a wall of said chamber, said support structure comprising pairs of elongated transversely spaced coplanar flanges, said crossbar structure comprising an elongated freight engaging bar, a load bar slidably connected to each end of said freight engaging bar, the outer end of the load bar being formed with a ball portion, a slider connection at the outer end of each load bar and having a hub portion and a pair of plates centrally carried by said hub portion in parallel spaced relation, said plates being adapted to be disposed at opposite faces of the flanges in embracing relation therewith, releasable locking means on said slider cooperable with said plates and with the flanges for retaining the crossbar structure in a selected position, and socket means extending through said hub portion in operative relation therewith and receiving said ball portion for pivotally connecting said load bar to said slider, said ball portion being disposed in substantial vertical alignment with said flanges when received in said socket portion.

10. A load sustaining crossbar structure for spanning the interior of a freight chamber and adjustably securable at each end to a support structure carried by an interior wall of said chamber, said support structure comprising pairs of elongated, transversely spaced coplanar flanges arranged in intersecting horizontal and vertical paths, said crossbar structure comprising an elongated freight engaging bar, a load bar slidably connected to each end of said freight engaging bar, the outer end of the load bar being formed with a ball portion, a slider connection at the outer end of each load bar having a hub portion and a pair of apertured plates centrally carried by said hub portion in parallel spaced relation and adapted to be disposed at opposite faces of the flanges in embracing relation therewith, said slider being movable between the flanges for registering the apertures in said plates with cooperating apertures in the flanges of a horizontal path, releasable locking means on said slider comprising a plurality of pins adapted to be engaged in the registered apertures for retaining the crossbar structure in a selected position along a horizontal path, socket means extending through said hub portion for operatively receiving said ball portion for pivotally connecting said load bar to said slider, and fall retarder means mounted on said slider and cooperable with the flanges of the vertical paths for resisting only downward movement of the slider in a vertical path.

11. A connection for the ends of a crossbar of a freight supporting and restraining system for slidably mounting the crossbar in a plurality of positions transversely spanning the interior of a freight chamber along a path defined by structure carried by the side walls of the chamber, said structure including a plurality of channels having longitudinally extending inturned coplanar flanges, said end connection comprising a slider having a pair of spaced parallel plates adapted to embrace the flanges of the channels for sliding movement therealong, said plates having at least one set of transverse aligned apertures therethrough adapted to register with cooperating perforations in the flanges of the channels, pin means carried by said slider adapted to be inserted through the registered apertures in said plates and the perforations in the flanges for releasably securing said crossbar in a selected position, and retaining means carried by said slider and engageable with said pin means for preventing unintended disengagement of the latter from a position securing said slider to the flanges.

12. A connection for the ends of a crossbar of a freight supporting and restraining system for slidably mounting the crossbar in a plurality of positions transversely spanning the interior of a freight chamber along a path defined by structure carried by the side walls of the chamber and including a plurality of channels having longitudinally extending inturned coplanar flanges, said end connection comprising a pair of parallel spaced plates adapted to embrace the flanges of the channels for sliding movement therealong, said plates having at least one pair of vertically spaced transversely extending aligned apertures therethrough adapted to register with cooperating perforations in the channel flanges, pin means comprising a plurality of pins adapted to be inserted through the registered apertures and perforations for releasably securing the slider to the path, means for effecting conjoint movement of said pin means into an engaging position in said apertures and perforations, and retaining means carried by said slider and engageable with said pin means for preventing unintended disengagement of said pin means.

13. An end connection according to claim 12 further characterized in that the means for effecting conjoint movement of said pin means comprises an annular member movable at least relatively transversely to said slider and rotatable for effecting engagement of said pin means.

14. A connection for the ends of a crossbar of a freight supporting and restraining system for slidably mounting the crossbar in a plurality of positions transversely spanning the interior of a freight chamber along horizontal paths defined by structure carried by the side walls of the chamber and including a plurality of longitudinally extending transversely spaced coplanar flanges having a series of horizontally offset perforations formed therein, said end connection comprising a pair of vertically arranged spaced parallel plates adapted to embrace the flanges for sliding movement therealong, said plates being generally rectangular in shape and having vertically aligned laterally spaced apertures therethrough disposed generally adjacent the corners of said plates and registerable with the perforations in the flanges, the apertures in said plates having a lateral spacing different from the spacing between adjacent pairs of perforations in said flanges, a plurality of pins carried by said slider and mounted for selective extended and retracted movement in diagonally opposed pairs into and out of the registered apertures in both of said plates and the perforations in said flanges, and operating means on said slider for manually effecting said movement whereby said crossbar may be minutely adjusted in various positions along said paths.

15. A connection for the ends of a crossbar of a freight supporting and restraining system for slidably mounting the crossbar in a plurality of positions transversely spanning the interior of a freight chamber along horizontal paths defined by structure carried by the side walls of the chamber and including a plurality of longitudinally extending transversely spaced coplanar flanges having a series of perforations formed therein, said end connection comprising a slider having a spaced pair of vertically arranged parallel plates adapted to embrace the flanges in sliding relation therewith, said plates having a plurality of transversely arranged aligned apertures therethrough adapted to be moved into registry with the perforations in the flanges, a guide member carried by one of said plates, a plurality of pins slidably carried by said guide member for movement through the registered apertures, and a cam ring carried by and engaging said pins and rotatable to effect extended and retracted movements of said pins.

16. An end connection according to claim 15 further characterized in that said cam ring includes a pair of diametrically spaced arcuate portions lying in a plane parallel to the plane of said slider plates and a pair of inclined arcuate portions interposed between said first mentioned arcuate portions, said pins being slotted to receive said cam ring in sliding and retaining engagement therewith.

17. A connection for the ends of a crossbar of a freight supporting and restraining system for slidably mounting the crossbar in a plurality of positions spanning the interior of a freight chamber along paths defined by structure carried by the side walls of the chamber and including a plurality of longitudinally extending spaced coplanar flanges, said end connection comprising a slider having a pair of parallel spaced plates adapted to embrace the flanges for sliding movement therealong, said plates having at least one pair of vertically spaced transversely extending aligned apertures therethrough adapted to register with cooperating perforations in the flanges, a ring member carried by said slider and mounted for rotational and axial movement, and at least one pair of pins rigidly mounted on said ring member for conjoint movement with said ring member to an engaged position with the registered apertures and perforations in the plates and flanges for releasably securing the slider to a path.

18. An end connection according to claim 17 further characterized in that said slider includes flexible spring retaining means secured to said slider and adapted to engage said pins to retain the latter in engagement with the registered apertures and perforations, said retaining means also coacting to support said ring member in operable position on said slider.

19. An end connection according to claim 18 further characterized in that said ring member includes a pair of depressible members cooperable with said retaining means for disengaging the latter from said pins to permit retraction of the pins.

20. A connection for the ends of a crossbar of a freight supporting and restraining system for slidably mounting the crossbar in a plurality of positions transversely spanning the interior of a freight chamber along paths defined by structure carried by the side walls of the chamber and including a plurality of longitudinally extending transversely spaced coplanar flanges, said end connection comprising a slider having a spaced pair of parallel vertically arranged plates adapted to embrace the inner and outer faces of the flanges in sliding relation therewith, said plates having at least one pair of vertically spaced transversely aligned apertures therethrough adapted to be moved into registry with cooperating perforations in the support flanges, a plurality of pins adapted to be inserted into and withdrawn from the registered apertures and perforations for releasably connecting said slider to said paths, and flexible means non-removably connecting said pins to said slider.

21. An end connection according to claim 20 further characterized in that said slider has mounted thereon depressible resilient retainer means engaging said pins for releasably retaining the latter in connecting position.

22. In a freight supporting and restraining system for a freight chamber wherein a load sustaining crossbar adjustably spans the interior of the chamber, the combination of wall mounted spaced coplanar flanges extending horizontally and vertically of the chamber, slider means for adjustably connecting the end of a crossbar to said flanges in sliding relation therealong, and a fall retarder mounted on said slider means and including spring pressed movable shoe means disposed adjacent said vertically extending flanges and operative to frictionally engage the latter for resisting downward movement of the slider means so as to retard free fall of the crossbar, and means operable in response to upward movement of the slider means for substantially releasing the frictional engagement of the shoe means with said flanges.

23. In a freight supporting and restraining system for a freight chamber having on the walls thereof a plurality of vertically and horizontally arranged intersecting paths for slidably mounting a freight supporting crossbar in a plurality of positions transversely spanning the interior of the chamber, the combination of elongated pairs of transversely spaced coplanar flanges defining said vertical and horizontal paths, slider means adapted to be mounted on the end of a crossbar and entrained in said path to permit sliding movement of the crossbar therealong and securement thereto in various positions of adjustment, and means supported on said slider means for increasing the frictional resistance of said slider means to downward movement of the crossbar to retard free fall thereof, said last named means comprising at least one shiftable friction member, spring means operatively coacting with said friction member for urging the latter into a frictional engaging position with at least one of the flanges of a vertical path, and a support slidably carrying said friction member, said friction member being shiftable on said support away from said frictional engaging position in response to upward movement of said slider means, and said support being disposed on said slider means so that said friction member does not engage the support flanges of the horizontal paths.

24. A crossbar end connection for connecting a load sustaining crossbar to a support having a pair of elongated transversely spaced coplanar flanges, said end connection comprising a slider adapted to be connected to the end of a crossbar and having a pair of spaced parallel plates adapted to be disposed in embracing relation at opposite faces of the flanges for sliding movement therealong, and fall retarder means mounted on one of said plates for frictionally and resiliently engaging the flanges during downward movement of the crossbar and thereby urging the other of said plates into frictional sliding contact with the support flanges for resisting only downward movement of the slider.

25. A crossbar end connection for connecting a load sustaining crossbar to a support having a pair of elongated transversely spaced coplanar flanges, said end connection comprising a slider adapted to be connected to the end of a crossbar and having a pair of spaced parallel plates adapted to be disposed in embracing relation at opposite faces of the flanges for sliding movement therealong, and fall retarder means mounted on one of said plates and cooperable with said slider and a support flange for resisting vertical downward movement of the slider, said fall retarder means comprising an upright pivot arm, a friction shoe slidably carried on said pivot arm and engagable with the flange, and spring means coacting with said pivot arm for urging said shoe into frictional braking engagement with the flange, said shoe being disposed at the upper portion of said pivot arm during said engagement and being shiftable downwardly on said pivot arm in response to upward movement of said slider for substantially releasing the shoe from said engagement.

26. The structure of claim 25 further characterized in that a spring member is provided on said pivot arm for normally urging said shoe upwardly on said pivot arm.

27. The structure of claim 25 further characterized in that said one plate is provided with a slot, and said pivot arm is mounted on said one plate in a position such that said shoe projects into said slot for frictionally engaging the support flange.

28. A crossbar end connection for connecting a load sustaining crossbar to a support having a pair of elongated transversely spaced coplanar flanges, said end connection comprising a slider adapted to be connected to the end of a crossbar and having a pair of spaced parallel plates adapted to be disposed in embracing relation at opposite faces of the flanges for sliding movement therealong, and fall retarder means mounted on one of said plates and cooperable with said slider and a flange for resisting vertical downward movement of the slider, said fall retarder means comprising a flexible spring member secured to said one plate, an upright pivot arm pivotally supported on said spring member, a friction shoe slidably carried on said pivot arm, said one plate having a slot therein and said spring member coacting with said pivot arm to urge the shoe through said slot into frictional engagement with the adjacent flange, and a coil spring normally urging said shoe upwardly on said pivot arm to a position projecting into and through said slot, said shoe being shiftable downwardly on said pivot arm against the action of said coil spring in response to upward movement of said slider for substantially releasing the shoe from said engagement.

29. The structure of claim 28 further characterized in that said pivot arm is pivoted out of contact with said one plate during said frictional engagement but is swingable into contact with said one plate when said shoe is released from said engagement.

30. A freight supporting and restraining system comprising a plurality of vertically and horizontally arranged intersecting paths carried on the side walls of a freight chamber, and a load sustaining crossbar slidably connected to said paths for movement between a plurality of positions transversely spanning the interior of the chamber, said vertically arranged paths including a series of portions between the intersections of said paths, each vertically arranged portion being horizontally offset relative to an adjacent portion, whereby to limit accidental free fall of the crossbar from an elevated position to a lower position.

31. The structure of claim 6 further characterized in that said socket means and said hub portion are constructed and arranged to accommodate about 15 degrees inclination of said crossbar relative to said slider.

References Cited in the file of this patent

UNITED STATES PATENTS

| | | |
|---|---|---|
| 2,345,650 | Attwood | Apr. 4, 1944 |
| 2,468,101 | Nampa | Apr. 26, 1949 |
| 2,513,348 | Nampa | July 4, 1950 |
| 2,616,375 | Nampa | Nov. 4, 1952 |
| 2,679,214 | Nampa | May 25, 1954 |
| 2,806,436 | Johnston | Sept. 17, 1957 |